(12) United States Patent
Koga et al.

(10) Patent No.: US 10,305,355 B2
(45) Date of Patent: May 28, 2019

(54) STATOR MANUFACTURING METHOD AND COIL

(71) Applicant: AISIN AW CO., LTD., Anjo-shi, Aichi-ken (JP)

(72) Inventors: Kiyotaka Koga, Nishio (JP); Shingo Hashimoto, Okazaki (JP); Shingo Sato, Okazaki (JP); Hisanori Shirai, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 230 days.

(21) Appl. No.: 15/529,835

(22) PCT Filed: Dec. 24, 2015

(86) PCT No.: PCT/JP2015/086101
§ 371 (c)(1),
(2) Date: May 25, 2017

(87) PCT Pub. No.: WO2016/104645
PCT Pub. Date: Jun. 30, 2016

(65) Prior Publication Data
US 2017/0264173 A1    Sep. 14, 2017

(30) Foreign Application Priority Data
Dec. 26, 2014  (JP) ................. 2014-265652

(51) Int. Cl.
*H01F 7/06*       (2006.01)
*H02K 15/085*    (2006.01)
(Continued)

(52) U.S. Cl.
CPC ........... *H02K 15/085* (2013.01); *H02K 1/16* (2013.01); *H02K 3/04* (2013.01); *H02K 3/14* (2013.01);
(Continued)

(58) Field of Classification Search
CPC .......... H02K 15/085; H02K 3/14; H02K 1/16; H02K 15/024; H02K 3/48; H02K 3/28;
(Continued)

(56) References Cited

U.S. PATENT DOCUMENTS 7,788,790 B2 *  9/2010  Neet ..................... H02K 3/345
                                                                29/596
8,164,229 B2 *  4/2012  Yamamoto .............. H02K 3/12
                                                                29/596
(Continued)

FOREIGN PATENT DOCUMENTS

DE   11 2012 003703 T5   7/2014
JP      2009-11116 A     1/2009
(Continued)

OTHER PUBLICATIONS

Mar. 29, 2018 Search Report issued in European Patent Application No. 15873213.1.
(Continued)

*Primary Examiner* — Donghai D Nguyen
(74) *Attorney, Agent, or Firm* — Oliff PLC

(57) ABSTRACT

A stator manufacturing method in which a coil including a plurality of coil units formed by winding a rectangular wire is fitted in a cylindrical core having a plurality of slots extending in a radial direction and opening in a core inner peripheral surface so that the slots are distributed in a circumferential direction, the rectangular wire being a linear conductor having a rectangular section.

3 Claims, 11 Drawing Sheets

(51) Int. Cl.
| | |
|---|---|
| *H02K 3/04* | (2006.01) |
| *H02K 1/16* | (2006.01) |
| *H02K 3/14* | (2006.01) |
| *H02K 3/28* | (2006.01) |
| *H02K 3/48* | (2006.01) |
| *H02K 15/02* | (2006.01) |
| *H02K 15/06* | (2006.01) |
| *H02K 3/12* | (2006.01) |
| *H02K 3/46* | (2006.01) |
| *H02K 15/08* | (2006.01) |

(52) U.S. Cl.
CPC ............... *H02K 3/28* (2013.01); *H02K 3/48* (2013.01); *H02K 15/024* (2013.01); *H02K 15/066* (2013.01); *H02K 3/12* (2013.01); *H02K 3/46* (2013.01); *H02K 15/08* (2013.01); *H02K 2213/03* (2013.01); *Y10T 29/49073* (2015.01)

(58) Field of Classification Search
CPC .......... H02K 15/066; H02K 3/04; H02K 3/46; H02K 15/08; H02K 3/12; H02K 2213/03; Y10T 29/49009; Y10T 29/49073

USPC ................................... 29/596, 606; 310/179
See application file for complete search history.

(56) References Cited

U.S. PATENT DOCUMENTS 8,587,177 B2 * 11/2013 Kitamura ................. H02K 3/12
310/179
2009/0001841 A1 1/2009 Naganawa et al.
2010/0259124 A1 10/2010 Bodin et al.
2013/0000105 A1 1/2013 Hasegawa et al.
2014/0201979 A1 7/2014 Yamaguchi

FOREIGN PATENT DOCUMENTS

| JP | 2011-193597 A | 9/2011 |
| JP | 2012-125043 A | 6/2012 |
| JP | 2014-050236 A | 3/2014 |

OTHER PUBLICATIONS

Mar. 8, 2016 Search Report issued in International Patent Application No. PCT/JP2015/086101.

* cited by examiner

STATOR MANUFACTURING METHOD AND COIL

BACKGROUND

The present disclosure relates to stator manufacturing methods in Which a coil is fitted in a cylindrical core, and coils that can be used in such stator manufacturing methods.

As described in, e.g., Japanese Patent Application Publication No. 2012-125043, a stator is known in which two coil units whose coil side portions are accommodated in the same slot are placed so that their coil side portions are alternately arranged in the radial direction in this slot. When a coil having such a structure is inserted into slots from the inside in the radial direction, the two coil units need to be moved relatively to each other in the axial direction or the circumferential direction. However, when the coil is placed radially inside the core, the coil units may interfere with each other and the coil may not be able to be placed radially inside the core.

SUMMARY

An exemplary aspect of the present disclosure provides a stator manufacturing method in which a unit assembly in which coil side portions of two coil units are alternately arranged in the radial direction at the same circumferential position can be placed radially inside a cylindrical core and attached to the cylindrical core. An exemplary aspect of the present disclosure also provides a coil suitable for such a manufacturing method.

A stator manufacturing method according to the present disclosure is a stator manufacturing method in which a coil including a plurality of coil units formed by winding a rectangular wire is fitted in a cylindrical core having a plurality of slots extending in a radial direction and opening in a core inner peripheral surface so that the slots are distributed in a circumferential direction, the rectangular wire being a linear conductor having a rectangular section, wherein each of the coil units includes, as coil side portions that are placed in the slots, first coil side portions that are placed in one of a pair of the slots, and second coil side portions that are placed in the other of the pair of the slots, the stator manufacturing method including: forming a unit assembly in which the plurality of coil units are arranged in an annular shape by fitting the plurality of coil units together so that the first coil side portions of a first one of the coil units and the second coil side portions of a second one of the coil units are placed in line in the radial direction and arranged alternately; and inserting, with the unit assembly being located radially inside the core, each of the coil side portions of the plurality of coil units forming the unit assembly into an associated one of the slots, wherein a combination of a core and a coil which satisfies the following relational expression (1) is used as the core and the coil $$2\pi \cdot (Ri - B \cdot L) > A \cdot N \quad (1)$$

where: A represents a circumferential width of the rectangular wire, B represents a radial width of the rectangular wire, L represents the number of coil side portions that are placed next to each other in the radial direction in each of the slots, N represents the number of slots, and Ri represents a radius of the core inner peripheral surface.

According to this configuration, a unit assembly in which the first coil side portions of the first coil unit and the second coil side portions of the second coil unit are arranged alternately and in line is formed by the unit assembly formation step. At this time, the use of the combination of the core and the coil which satisfies the relational expression (1) ensures that the unit assembly formed by the unit assembly formation step is reliably placed radially inside the core with at least each coil unit being located on the inner side in the radial direction. The subsequent insertion step can thus be performed appropriately. That is, a stator manufacturing method can be implemented in which the unit assembly having the coil side portions of two coil units being arranged alternately in the radial direction at the same circumferential direction can be placed radially inside the cylindrical core and fitted therein.

A coil according to the present disclosure is a coil that is fitted in a cylindrical core having a plurality of slots extending in a radial direction and opening in a core inner peripheral surface so that the slots are distributed in a circumferential direction, including: a plurality of coil units each formed by a rectangular wire and each wound between a pair of the slots, the rectangular wire being a linear conductor having a rectangular section, wherein each of the coil units includes, as coil side portions that are placed in the slots, first coil side portions that are placed in one of a pair of the slots, and second coil side portions that are placed in the other of the pair of the slots, a plurality of the coil side portions are placed in line in the radial direction in each of the slots, and the first coil side portions of a first one of the coil units and the second coil side portions of a second one of the coil units are alternately arranged, and the coil satisfies the following relational expression (1)

$$2\pi \cdot (Ri - B \cdot L) > A \cdot N \quad (1)$$

where: A represents a circumferential width of the rectangular wire, B represents a radial width of the rectangular wire, L represents the number of coil side portions that are placed next to each other in the radial direction in each of the slots, N represents the number of slots, and Ri represents a radius of the core inner peripheral surface.

According to this configuration, for example, when a unit assembly is formed by fitting the coil units together with the first coil side portions of the first coil unit and the second coil side portions of the second coil unit being arranged alternately and in line, this unit assembly has such a size that it can be placed radially inside the core with at least each coil unit being located on the inner side in the radial direction. Accordingly, the unit assembly is subsequently placed radially inside the core, and in this state, each coil unit is moved radially outward so that the coil side portions of each coil unit can be inserted into associated slots. That is, a coil can be implemented which is an assembly in which coil side portions of two coil units are arranged alternately in the radial direction at the same circumferential position, and which can be fitted into a cylindrical core from the inside in the radial direction.

Further features and advantages of the technique according to the present disclosure will become apparent from the following description.

DETAILED DESCRIPTION OF EMBODIMENTS

An embodiment of the present disclosure will be described below. The embodiment described below is not intended to limit the scope of the present disclosure.

An embodiment of a stator manufacturing method and a coil will be described with reference to the drawings. In the present embodiment, a stator 1 of a rotating electrical machine shown in FIG. 1 will be described as an example. The present embodiment will be described with respect to a method for manufacturing the stator 1 and a coil 3 suitable for this manufacturing method. In the present embodiment, a core 2 in which the coil 3 is fitted is a core of the stator 1 (stator core). The term "rotating electrical machine" is a concept including all of a motor (electric motor), a generator (electric generator), and a motor-generator that functions as both a motor and a generator as necessary.

As used herein, the "axial direction L," the "circumferential direction C," and the "radial direction R" are defined based on the axis of the cylindrical core 2 (unless otherwise specified). The axis of the core 2 is the axis of the inner peripheral surface of the core 2 (core inner peripheral surface 25). The positions, directions, etc. in the following description of each part of the coil 3 etc, refer to the positions, directions, etc. in the state where the coil 3 is fitted in the core 2 (see FIG. 1) unless otherwise specified.

In the following description, the terms regarding the dimensions, the direction in which an element is placed, the position where an element is placed, etc.) parallel etc.) are concepts including variations due to tolerance (acceptable range of manufacturing variation).

In the figures that are referred to in the following description, the scales, the proportions of the dimensions in the lateral and vertical directions, etc. are sometimes different from those of actual products in order to simplify the figures, facilitate understanding, etc.

Figure 1:
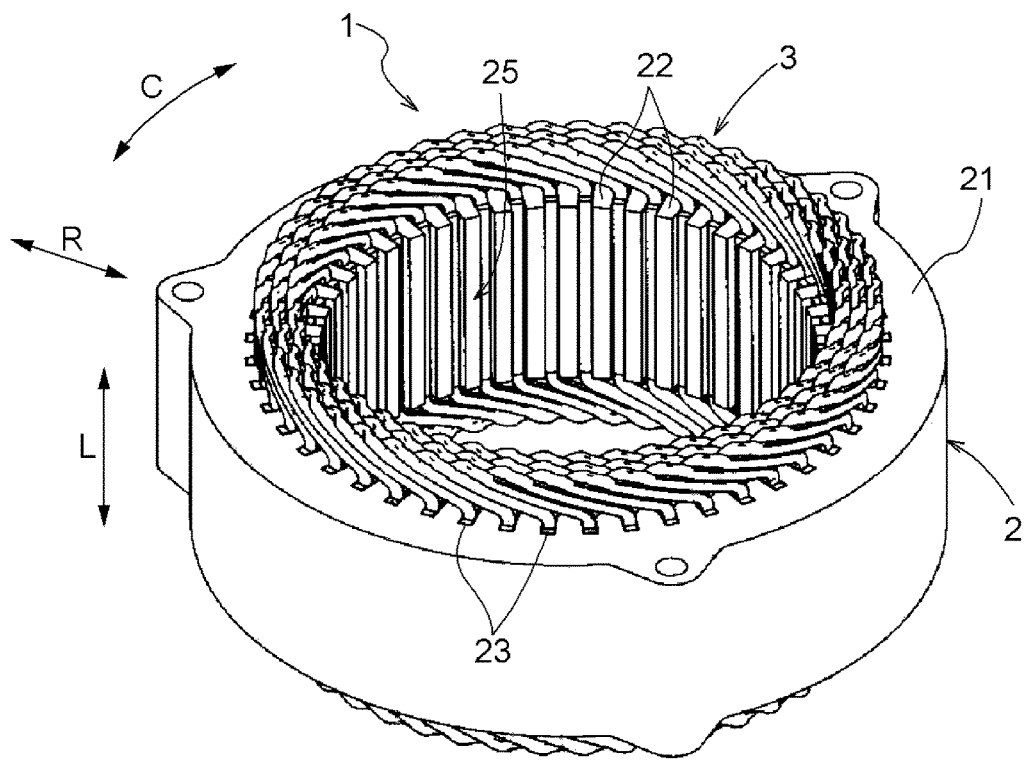
FIG. 1 is a perspective view of a stator according to an embodiment.

As shown in FIG. 1, the stator 1 includes the core 2 and the coil 3 that is fitted in the core 2. For example, the stator 1 is a stator that is used in a revolving-field rotating electrical machine, and functions as an armature. A rotor (not shown) serving as a field including permanent magnets, electromagnets, etc. is placed in the space radially inside the core 2 with an air gap therebetween. The rotor is rotated by a rotating magnetic field that is generated by the stator 1. In the present embodiment, the stator 1 is a stator of a rotating electrical machine that is driven by a three-phase alternating current (an example of a multi-phase alternating current). The coil 3 including three-phase coils, namely a U-phase coil, a V-phase coil, and a W-phase coil, is fitted in the core 2. The core 2 is made of a magnetic material, and for example, is formed by stacking a plurality of magnetic material sheets (e.g., magnetic steel sheets such as silicon steel sheets) in the axial direction L. The core 2 may be mainly made of a green compact produced by pressing powder of a magnetic material.

The core 2 has a hollow cylindrical shape. The core 2 has an annular yoke portion 21 and a plurality of teeth 22 extending radially inward from the yoke portion 21. The plurality of teeth 22 are located at regular intervals in the circumferential direction C. A slot 23 that opens radially inward is formed between two teeth 22 which adjoin each other in the circumferential direction C. That is, the cylindrical core 2 has a plurality of slots 23 extending in the radial direction R and opening in the core inner peripheral surface 25 such that the slots 23 are distributed in the circumferential direction C. The core inner peripheral surface 25 is a cylindrical surface including the radially inner end faces of the plurality of teeth 22. The plurality of slots 23 are located at regular intervals in the circumferential direction C. Each slot 23 of the present embodiment is a parallel slot. Namely, of inner walls (wall portions facing the space inside the slot) 23a of each slot 23, a pair of sidewalls 23b facing each other in the circumferential direction C are parallel to each other (see FIG. 5).

Figure 5:
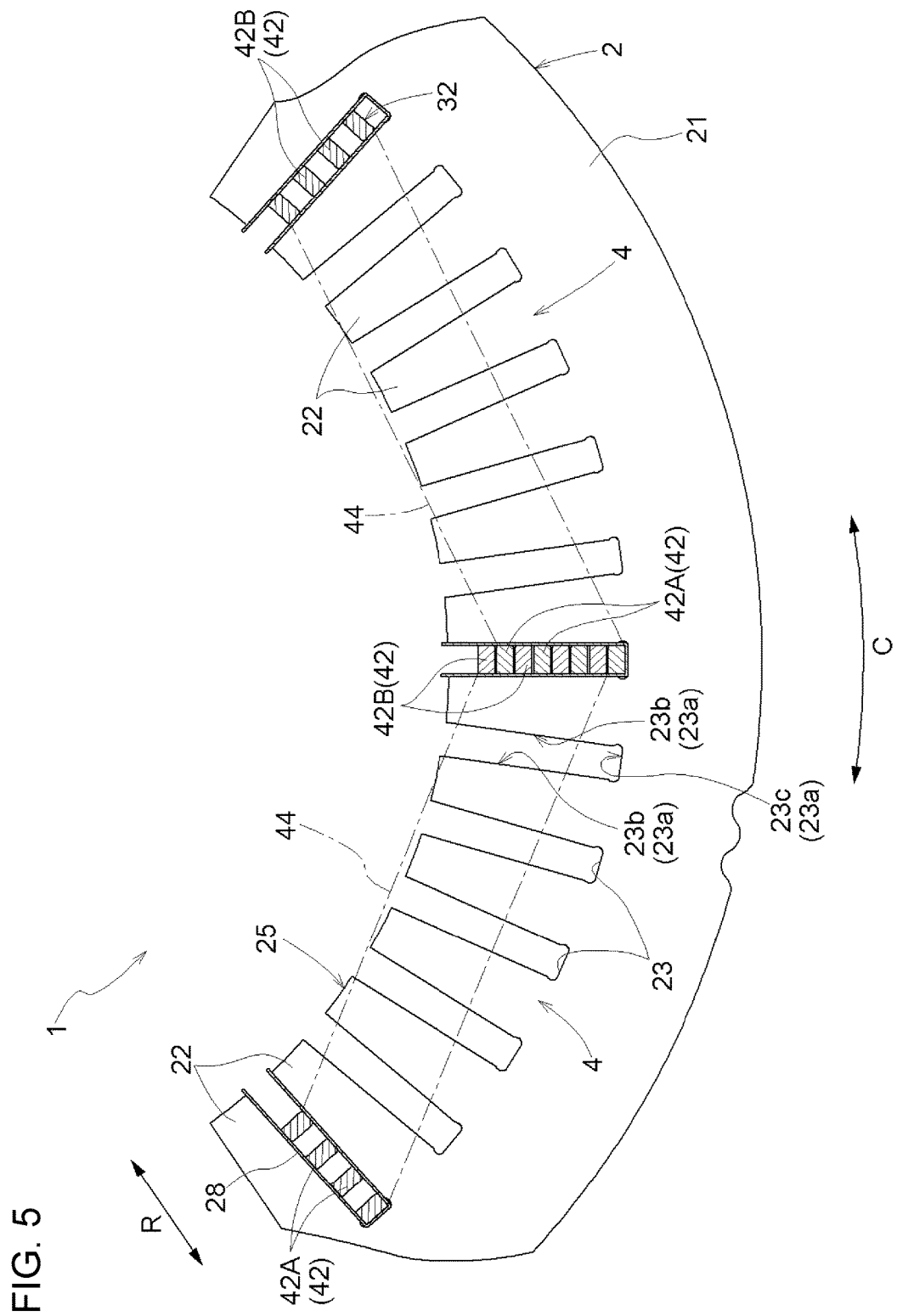
FIG. 5 is a partial sectional view of the stator.

In the present embodiment, the slots 23 for U-phase, the slots 23 for V-phase, and the slots 23 for W-phase are formed in a repeated pattern of U-phase, V-phase, and W-phase in the circumferential direction C. In the present embodiment, the number of slots per pole per phase is "2," and the slots 23 for each phase are formed in the core 2 in a repeated pattern of two slots for U-phase, two slots for V-phase, and two slots for W-phase in the circumferential direction C. In the present embodiment, the number of magnetic poles per phase is "8" (the number of magnetic pole pairs is "4"), and a total of 48 (=2×8×3) slots 23 are formed in the core 2. As shown in FIG. 5, an insulating sheet 28 is placed along the inner walls 23a of each slot 23. The insulating sheet 28 has an elongated, angular U-shape in section so as to extend along the pair of sidewalls 23b and a bottom wall 23c which form the inner walls 23a of the slot 23. The insulating sheet 28 is provided in order to ensure electrical insulation between the core 2 and the coil 3. The insulating sheet 28 is a sheet material made of a highly insulating, highly heat resistant material. For example, the insulating sheet 28 may be a resin sheet, a paper sheet, etc. Coil side portions 42 of coil units 4 forming the coil 3 are placed in each slot 23.

The coil 3 is formed by linear conductors, namely conductors having a linear shape. In the present embodiment, the coil 3 is formed by rectangular wires 32 that are linear conductors having a rectangular section. The term "rectangular" is a concept including a substantially rectangular shape in addition to a rectangular shape, and for example, including a rectangular shape with arc-shaped rounded corners, a rectangular shape with chamfered corners, etc. The expression "having a rectangular section" means that the sectional shape perpendicular to the direction in which the linear conductor extends is a rectangle. In the present embodiment, the rectangular wire 32 has a rectangular section including a pair of opposing long sides and a pair of opposing short sides.

The rectangular wire 32 has a flat (in this example, with an aspect ratio of 2:1) rectangular section. The rectangular wire 32 is made of a conductive material such as a metal material (e.g., copper, aluminum, etc.), and has on its surface an insulating coating that is made of an insulating material such as resin, an oxide coating, etc.

The coil 3 includes a plurality of coil units 4 (see FIG. 2) that are each wound between a pair of slots 23. The coil 3 includes the same number of (in this example, 48) coil units 4 as the teeth 22 and the slots 23. The coil unit 4 is a cassette coil that is formed by bending before being fitted in the core 2. For example, a single coil unit 4 can be formed by winding a single rectangular wire 32 while forming the rectangular wire 32 into a circular or elliptical shape, and then bending the resultant rectangular wire 32 into a polygonal shape (e.g., a hexagonal shape, an octagonal shape, etc.)

Figure 2:
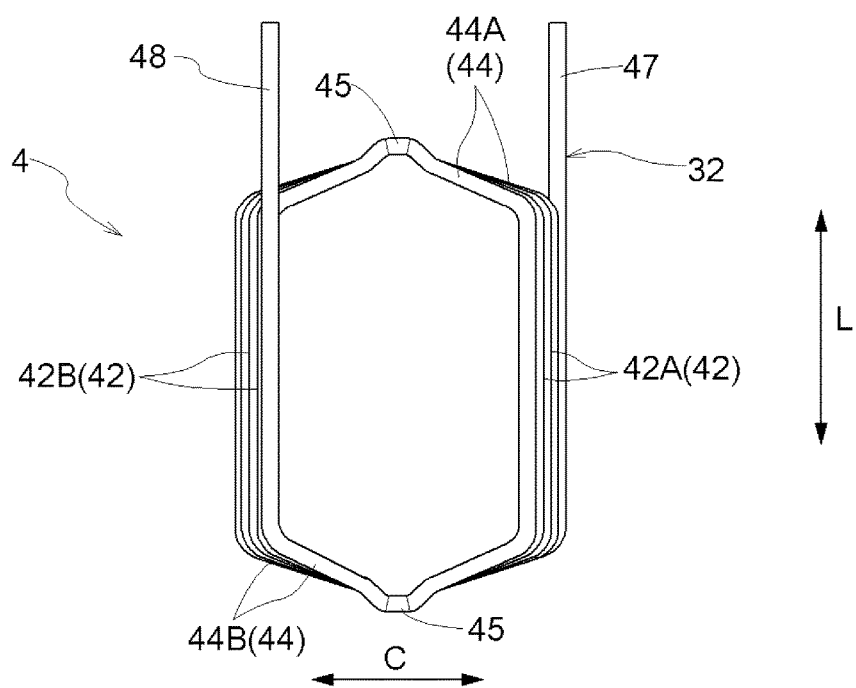
FIG. 2 is a front view of a coil unit.

As shown in FIG. 2, the coil unit 4 includes a pair of coil side portions 42 extending in the axial direction L, and a pair of bridging portions 44 extending in the circumferential direction C. The coil side portions 42 are portions that are placed in the slots 23. The coil side portions 42 extend straight so as to extend through the slots 23 in the axial direction L. The coil unit 4 includes, as the coil side portions 42, first coil side portions 42A that are placed in one of paired slots 23, and second coil side portions 42B that are placed in the other of the paired slots 23. The first coil side portions 42A and the second coil side portions 42B are placed in a pair of slots 23 that are separated from each other by a magnetic pole pitch (in this example, six times the pitch of the slots 23). Each coil side portion 42 is placed in the slot 23 with the insulating sheet 28 interposed between the coil side portion 42 and the inner walls 23a of the slot 23 (see FIG. 5).

Figure 3:
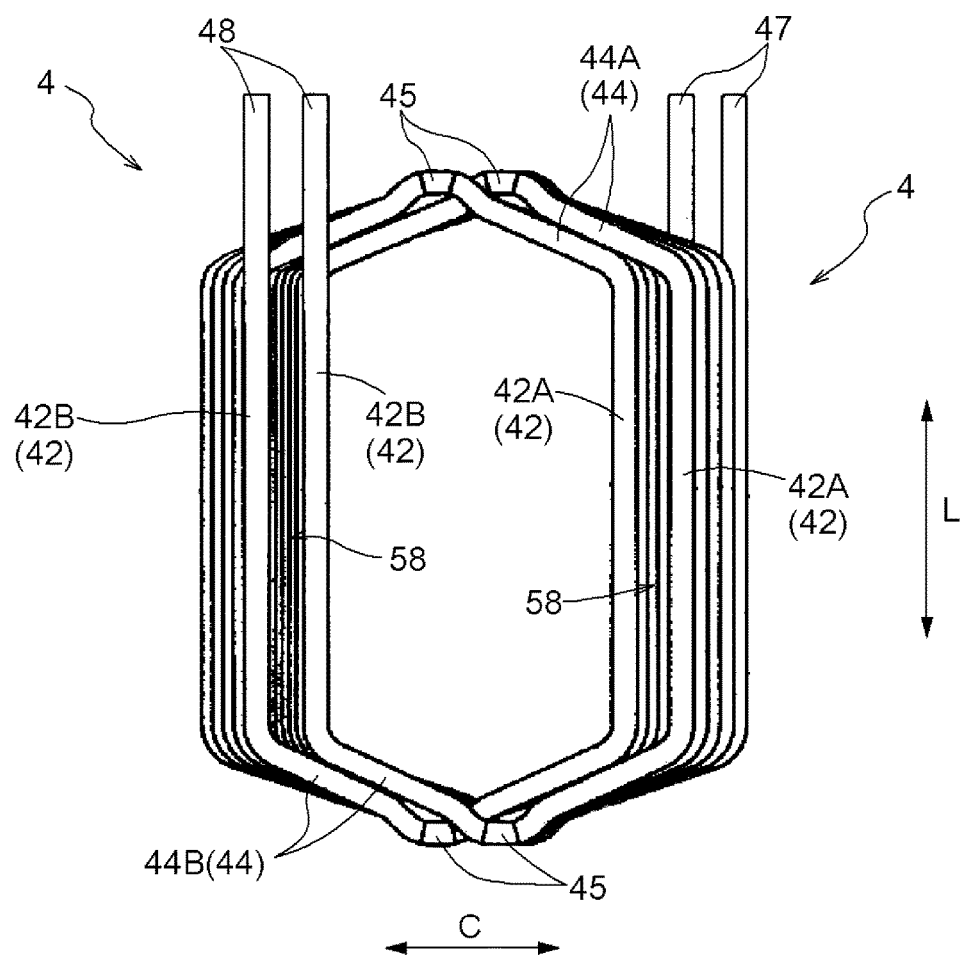
FIG. 3 is a front view showing the positional relationship between adjoining two coil units.
Figure 4:
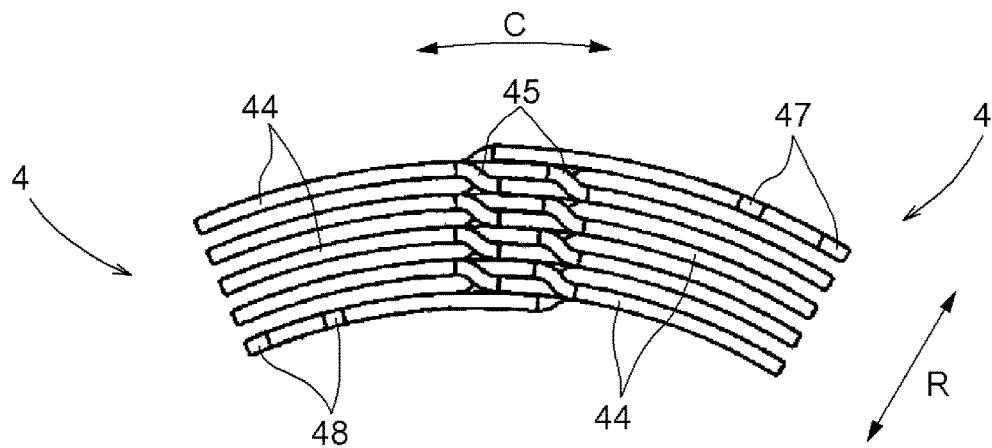
FIG. 4 is a plan view showing the positional relationship between adjoining two coil units.

The bridging portions 44 are portions that are formed at positions outside (outside in the axial direction L) the core 2 to connect the pair of coil side portions 42, placed in different slots 23, in the circumferential direction C. The bridging portions 44 are formed at such positions that the bridging portions 44 project outward in the axial direction L from the axial end faces of the core 2, and are formed in an arc shape so as to extend substantially in the circumferential direction C. The coil unit 4 includes, as the bridging portions 44, first bridging portions 44A located on one side of the core 2 in the axial direction L and second bridging portions 44B located on the other side. The bridging portions 44 each have an offset portion 45 in its intermediate part in the circumferential direction C, which is formed by offsetting the rectangular wire 32 in the radial direction R. As shown in FIGS. 3 and 4, the offset portion 45 is a bent portion that is provided to make a lane change while avoiding interference between the bridging portions 44 in two coil units 4 adjoining each other in the circumferential direction C.

The coil unit 4 is formed by winding the rectangular wire 32 a plurality of times. The coil unit 4 is thus a continuous coil that is formed by winding a single rectangular wire 32 a plurality of times. The continuous coil is a coil having a first slot accommodated portion (e.g., the first coil side portions 42A described above) that is accommodated in a predetermined slot 23, a second slot accommodated portion (e.g., the second coil side portions 42B described above) that is accommodated in a different slot 23 from the first slot accommodated portion, a first coil end portion (e.g., the first bridging portions 44A described above) that connects the two slot accommodated portions on one side in the axial direction L, and a second coil end portion (e.g., the second bridging portions 44B described above) that connects the two slot accommodated portions on the other side in the axial direction L. The coil unit 4 may be a concentric winding unit serving as a component of a concentric winding coil, or may be a wave winding unit serving as a component of a wave winding coil.

FIGS. 2 to 4 show an example in which the rectangular wire 32 is wound five times to form the coil unit 4. However, the number of turns may be determined as appropriate according to performance etc. required for rotating electrical machines (as an example, see FIG. 6 etc. showing the case where the number of turns is 4). In FIGS. 2 and 3, a lead portion 47 that connects to a power line, and a connection portion 48 that connects to other coil unit 4 or a neutral point are shown extending straight. However, the lead portion 47 and the connection portion 48 may have any specific shape or may have any other shape according to the purpose (see FIG. 6 etc.).

As shown in FIG. 3, an inter-side clearance 58 extending in the axial direction L and the radial direction R is provided between the first coil side portions 42A of two coil units 4 adjoining each other in the circumferential direction C. Similarly, an inter-side clearance 58 extending in the axial direction L and the radial direction R is provided between the second coil side portions 42B thereof. These inter-side clearances 58 serve as tooth placement spaces (tooth holes) in which the teeth 22 are placed when the coil 3 (coil units 4) is finally fitted in the core 2.

As shown in FIGS. 4 and 5, a plurality of first coil side portions 42A of a single coil unit 4 are placed in line at intervals in the radial direction R so that a space having a size corresponding to the rectangular wire 32 is provided between two first coil side portions 42A which adjoin each other in the radial direction R.

The plurality of first coil side portions 42A are placed in line at intervals in the radial direction R so that the short side of the rectangular wire 32 having a rectangular section extends in the radial direction R. Similarly, a plurality of second coil side portions 42B of a single coil unit 4 are placed in line at intervals in the radial direction R so that a space having a size corresponding to the rectangular wire 32 is provided between two second coil side portions 42B which adjoin each other in the radial direction R. The plurality of second coil side portions 42B are placed in line at intervals in the radial direction R so that the short side of the rectangular wire 32 having a rectangular section extends in the radial direction R.

In each space provided between two first coil side portions 42A which adjoin each other in the radial direction R, the second coil side portion 42B of another coil unit 4 of the same phase is placed. Each of the second coil side portions 42B of a single coil unit 4 is placed so as to be sandwiched between the first coil side portions 42A of another coil unit 4 from both sides in the radial direction R. Similarly, the first coil side portions 42A of other coil unit 4 of the same phase are each placed in a space provided between two second coil side portions 42B which adjoin each other in the radial direction R. Each of the first coil side portions 42A of a single coil unit 4 is placed so as to be sandwiched between the second coil side portions 42B of another coil unit 4 from both sides in the radial direction R. A plurality of coil side portions 42 are thus placed in line in the radial direction R in each slot 23, and first coil side portions 42A of a first coil unit 4 and second coil side portions 42B of a second coil unit 4 are arranged alternately in the radial direction R. All of the first coil side portions 42A of the first coil unit 4 and all of the second coil side portions 42B of the second coil unit 4 different from the first coil unit 4 are arranged in each slot 23.

In a single coil unit 4, the interval (circumferential interval) between the first coil side portion 42A and the second coil side portion 42B which adjoin each other in the direction in which the rectangular wire 32 extends varies depending on the radial position. The coil unit 4 is formed so that the interval between the first coil side portion 42A and the second coil side portion 42B increases from the inside in the radial direction toward to the outside in the radial direction. The coil unit 4 is thus curved so that it generally has the shape of an arc band as viewed in the axial direction L.

Procedures for manufacturing the stator 1 which are carried out by using the coil units 4 described above will be sequentially described below. The stator manufacturing method of the present embodiment includes a unit assembly formation step, a guide jig attachment step, and an insertion step. The unit assembly formation step, the guide jig attachment step, and the insertion step are performed in this order.

Figure 6:
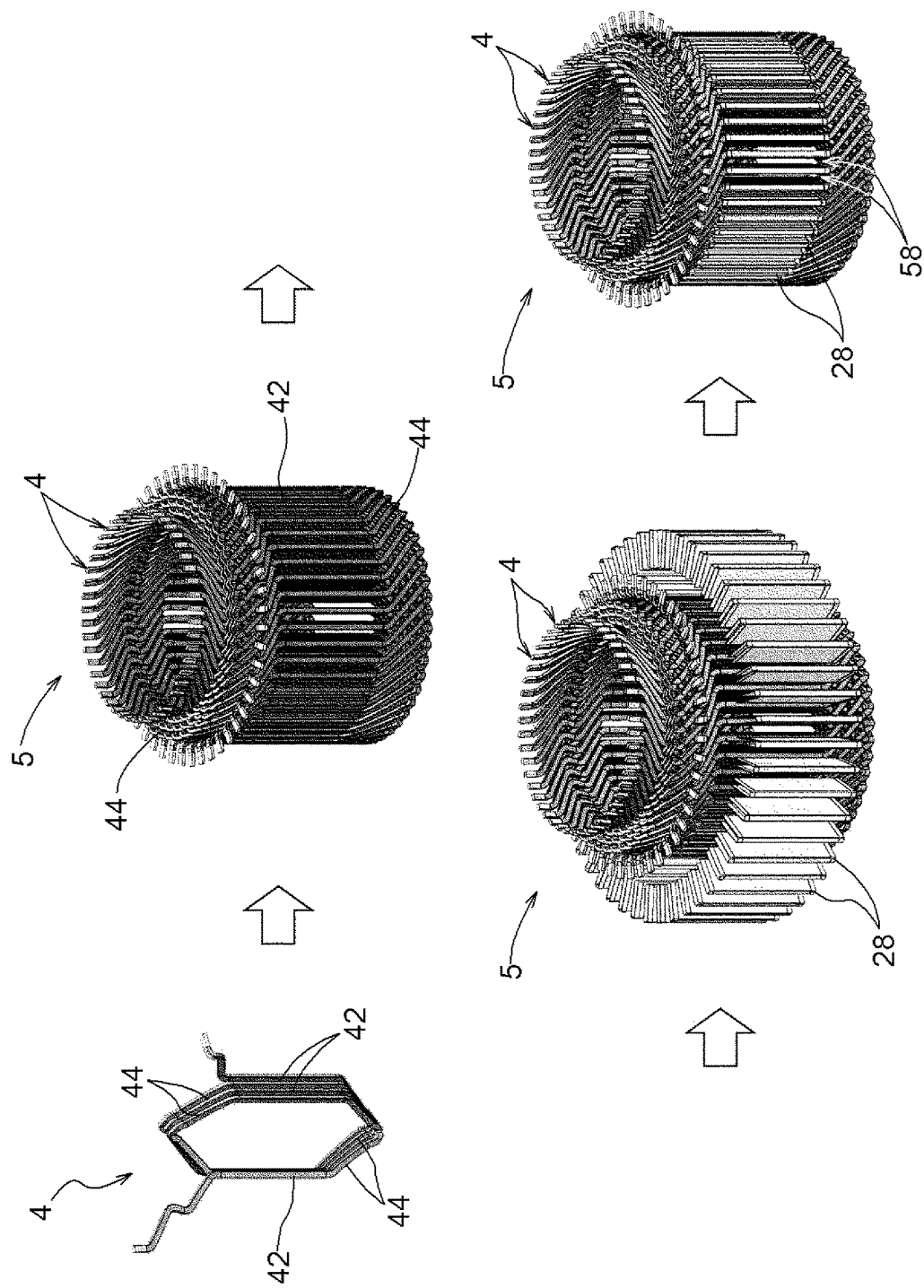
FIG. 6 is a diagram illustrating procedures of a unit assembly formation step.

The unit assembly formation step is a step of forming a unit assembly 5 comprised of a plurality of coil units 4 arranged in an annular shape. As shown in FIG. 6, in the unit assembly formation step, a plurality of (in this example, 48, which is the same number as the teeth 22 and the slots 23) coil units 4 are arranged in the circumferential direction C to form a cylindrical basket-shaped unit assembly 5. The unit assembly 5 is formed so as to implement the following structures (A) to (C).

(A) The plurality of coil units 4 are sequentially arranged with a pair of slots 23 in which a pair of coil side portions 42 are placed being shifted one by one in the circumferential direction C.

(B) Two coil units 4 which adjoin each other in the circumferential direction C are fitted together so that the rectangular wires 32 in each layer are located at the same radial position and overlap each other as viewed in the axial direction L except for the offset portions 45 and the coil side portions 42 located at both ends (see FIG. 4).

(C) Two coil units 4 of the same phase which are separated from each other by a magnetic pole pitch (in this example, six times the pitch of the slots 23) in the circumferential direction C are fitted together so that the first coil side portions 42A of the first coil unit 4 and the second coil side portions 42B of the second coil unit 4 are arranged alternately and in line.

For example, in the case where the stator 1 is applied to a rotating electrical machine that is driven by a three-phase alternating current as in the present embodiment, each coil unit 4 finally forms one of a U-phase coil, a V-phase coil, and a W-phase coil. For example, six coil units 4 arranged next to each other in the circumferential direction C, namely two coil units 4 for U-phase, two coil units 4 for V-phase, and two coil units 4 for W-phase which are arranged next to each other in the circumferential direction C, form a single magnetic pole. The coil 3 including the U-phase coil, the V-phase coil, and the W-phase coil is formed by arranging a total of eight sets of such six coil units 4 next to each other in the circumferential direction C.

After the unit assembly 5 is formed by fitting the plurality of coil units 4 together, the insulating sheet 28 is attached to the coil side portions 42 of each coil unit 4. The insulating sheet 28 is inserted and attached radially inward from the outside in the radial direction onto the coil side portions 42 placed in line in the radial direction R at the same circumferential direction.

In this unit assembly formation step, in the present embodiment, a combination of a core and a coil (coil units) which satisfy a predetermined relational expression is used as the core 2 and the coil 3 (coil units 4). For example, in the case where the specification of the core 2 has been defined according to the performance etc. required for rotating electrical machines and cannot be changed, the coil 3 (coil units 4) that satisfies a predetermined relational expression in relation to the specification of the core 2 is used. The coil 3 (coil units 4) that satisfies the following relational expression (1) is used in the present embodiment.

$$2\pi \cdot (Ri - B \cdot L) > A \cdot N \tag{1}$$

In the relational expression (1), an algebra "A" represents the circumferential width (in this example, the length of the long side; see FIG. 7) of the rectangular wire 32 having a rectangular section. An algebra "B" represents the radial width (in this example, the length of the short side) of the rectangular wire 32 having a rectangular section. An algebra "L" represents the number of coil side portions 42 (the total number of layers) that are placed next to each other in the radial direction R in each slot 23. An algebra "N" represents the number of slots 23. An algebra "Ri" represents the radius of the core inner peripheral surface 25 (the length of separation between the axis X of the core 2 and the radially inner end faces of the teeth 22).

The above relational expression (1) can be rewritten as the following relational expression (1').

$$(A \cdot N)/2\pi + B \cdot L < Ri \tag{1'}$$

Figure 7:
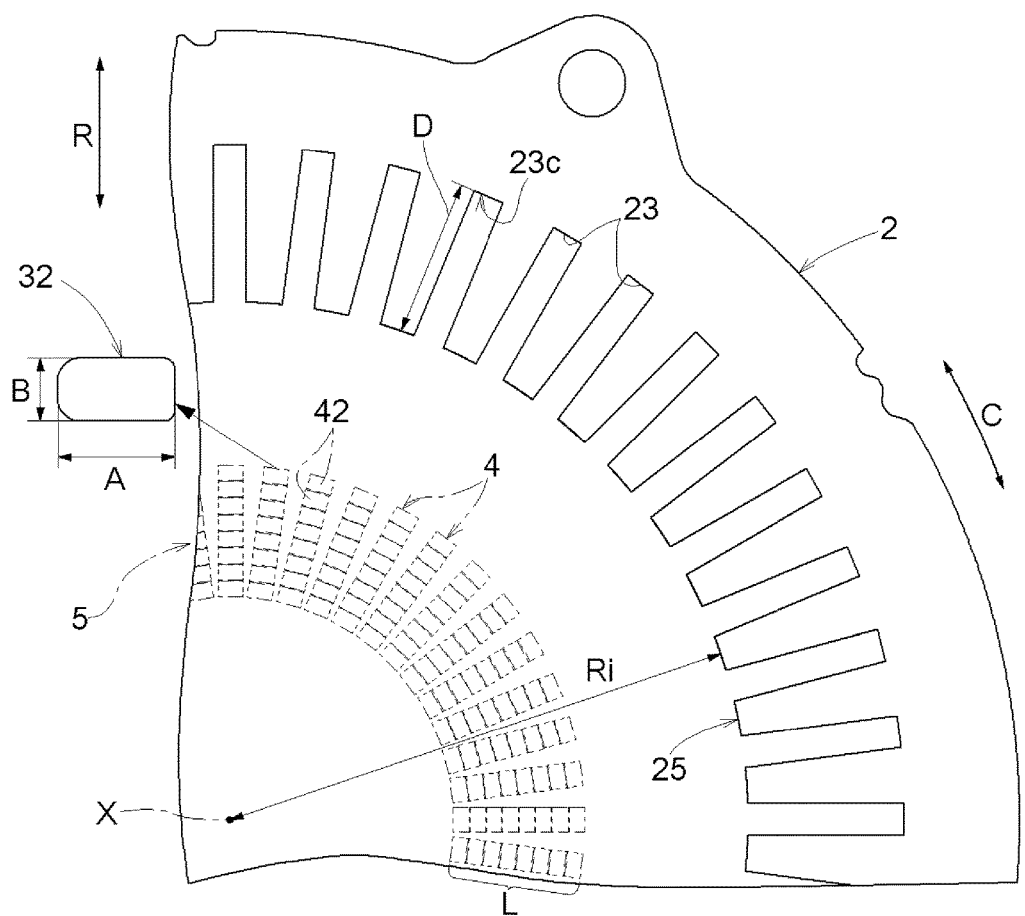
FIG. 7 is an imaginary view illustrating the relationship in size between a unit assembly and a core.

In the relational expression (1'), "A·N" in the first term of the left side can be regarded as the circumference of the inner peripheral surface of the unit assembly 5 in the state where the coil units 4 forming the unit assembly 5 are closely located on the inner side in the radial direction (on the axis X side) and the coil side portions 42 contact each other in the circumferential direction C and thus the diameter of the unit assembly 5 cannot be reduced any more (the state shown by imaginary lines in FIG. 7; hereinafter referred to as the "minimum diameter state"). "(A·N)/2π," which is "A·N" divided by twice the ratio of the circumference of a circle to its diameter "π," can be regarded as the radius of the inner peripheral surface of the unit assembly 5 in such a state (the minimum radius of the inner periphery of the unit assembly 5). "B·L" in the second term of the left side can be regarded as the thickness in the radial direction R of the unit assembly 5 formed by fitting the plurality of coil units 4 together. The entire left side of the relational expression (1') can therefore be regarded as the radius of the outer peripheral surface of the unit assembly 5 in the minimum diameter state where the coil units 4 are closely located on the inner side in the radial direction. As can be seen from the relational expression (1'), the use of the coil 3 (coil units 4) that satisfies the relational expression (1) in relation to the specification of the core 2 ensures that the unit assembly 5 is reliably placed radially inside the core 2.

In the unit assembly 5 in the minimum diameter state described above, the coil units 4 do not obliquely contact each other. This can effectively restrain damage to the rectangular wire 32.

In view of reliability, ease of operation, etc. at the time of placing the unit assembly 5 radially inside the core 2, it is preferable to use the coil 3 (coil units 4) that satisfies the following relational expression (1B) (and the relational expression (1C)).

$$4\pi \cdot (R1 - B \cdot L) > 3 A \cdot N \tag{1B}$$

$$\pi \cdot (Ri - B \cdot L) > A \cdot N \quad (1C)$$

The coil 3 (coil units 4) which satisfies the following relational expression (2) in relation to the specification of the core 2 is used in the present embodiment. In the relational expression (2), an algebra "D" represents the depth of the slot 23 (the length in the radial direction R from the opening on the inner side in the radial direction to the bottom wall 23c). Algebras "B," "L" are the same as those in the above relational expression (1).

$$B \cdot L < D \quad (2)$$

In the relational expression (2), "B·L" of the left side can be regarded as the total length of a plurality of coil side portions 42 in the radial direction R that are finally placed in line in each slot 23. Accordingly, the use of the coil 3 (coil units 4) that satisfies the relational expression (2) in relation to the specification of the core 2 ensures that all of the coil side portions 42 are placed appropriately in each slot 23 of the final stator 1 without protruding radially inward from the slots 23.

Figure 8:
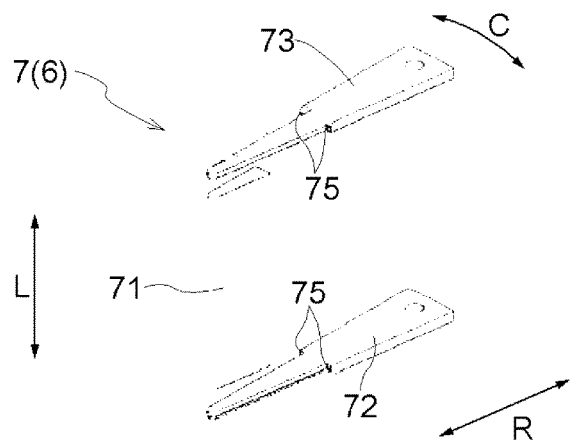
FIG. 8 is a perspective view of a guide jig.

The guide jig attachment step is a step of attaching guide jigs 7 of a stator manufacturing device 6 to the unit assembly 5 formed in the unit assembly formation step. The guide jigs 7 are insertion assisting members that allow each coil unit 4 to be smoothly inserted into associated slots 23. The guide jigs 7 and a pressing device 8 are included in the stator manufacturing device 6. As shown in FIG. 8, each guide jig 7 is formed by three members, namely a first guide member 71, a second guide member 72, and a third guide member 73. The second guide member 72 and the third guide member 73 have corresponding shapes, and are placed on both sides of the first guide member 71 in the axial direction L so as to sandwich the first guide member 71 therebetween in the axial direction L.

The first guide member 71 is formed in the shape of a plate extending in the axial direction and the radial direction R. The first guide member 71 has a tapered shape so that its circumferential width gradually decreases from the outside in the radial direction toward the inside in the radial direction. The first guide member 71 is inserted so that the entire first guide member 71 is fitted in the inter-side clearance 58 of the unit assembly 5 (see FIGS. 9 and 10). The first guide member 71 is formed so that the circumferential width (thickness in the circumferential direction C) at its radially outer end is equal to or greater than the circumferential width at the radially inner end of the tooth 22 of the core 2. In the insertion step that is performed later, each of the first guide members 71 is placed radially inside a corresponding one of the teeth 22 so as to face the corresponding tooth 22. The first guide members 71 serve to guide the coil side portions 42 of the coil units 4 to be inserted into the slots 23 so that the coil side portions 42 smoothly move in the radial direction R, while supporting the coil side portions 42 in the circumferential direction C.

Each of the second guide member 72 and the third guide member 73 is formed in the shape of a plate extending in the radial direction R and the circumferential direction C. Each of the second guide member 72 and the third guide member 73 has a tapered shape so that its circumferential width gradually decreases from the outside in the radial direction toward the inside in the radial direction. Each of the second guide member 72 and the third guide member 73 has a pair of cutouts 75 formed on both sides in the circumferential direction C of its middle part in the radial direction R. Each of the second guide member 72 and the third guide member 73 is formed in the shape of a wedge so that its tip end portion located radially inside the cutouts 75 is pointed. The second guide member 72 is placed so that its pointed part on the tip end side is located on one side of the first guide member 71 in the axial direction L and faces an axial end face of the first guide member 71. The third guide member 73 is placed so that its pointed part on the tip end side is located on the other side of the first guide member 71 in the axial direction L (on the opposite side from the second guide member 72) and faces an axial end face of the first guide member 71. The pointed parts of the second guide member 72 and the third guide member 73 together with the first guide member 71 are inserted into the inter-side clearance 58 of the unit assembly 5 (see FIGS. 9 and 10).

Each of the second guide member 72 and the third guide member 73 is formed so that the circumferential width (thickness in the circumferential direction C) of its pointed part is substantially equal to the circumferential width of the first guide member 71 at the same radial position. Each of the second guide member 72 and the third guide member 73 is formed so that its circumferential width is larger than the circumferential width of the tooth 22 at every position in the radial direction R. In the insertion step that is performed later, the second guide member 72 is placed so as to face the end face on one side of the tooth 22 in the axial direction L, and the third guide member 73 is placed so as to face the end face on the other side of the tooth 22 in the axial direction L (on the opposite side from the second guide member 72). The second guide members 72 and the third guide members 73 serve to guide the boundary portions (bent portions) between the coil side portions 42 and the bridging portions 44 of the coil units 4 to be inserted into the slots 23 so that the boundary portions smoothly move in the radial direction R, while supporting the boundary portions in the circumferential direction C and the axial direction L. At the same time, the second guide members 72 and the third guide members 73 serve to prevent the insulating sheets 28 from coming off from the slots 23 in the axial direction L.

Figure 9:
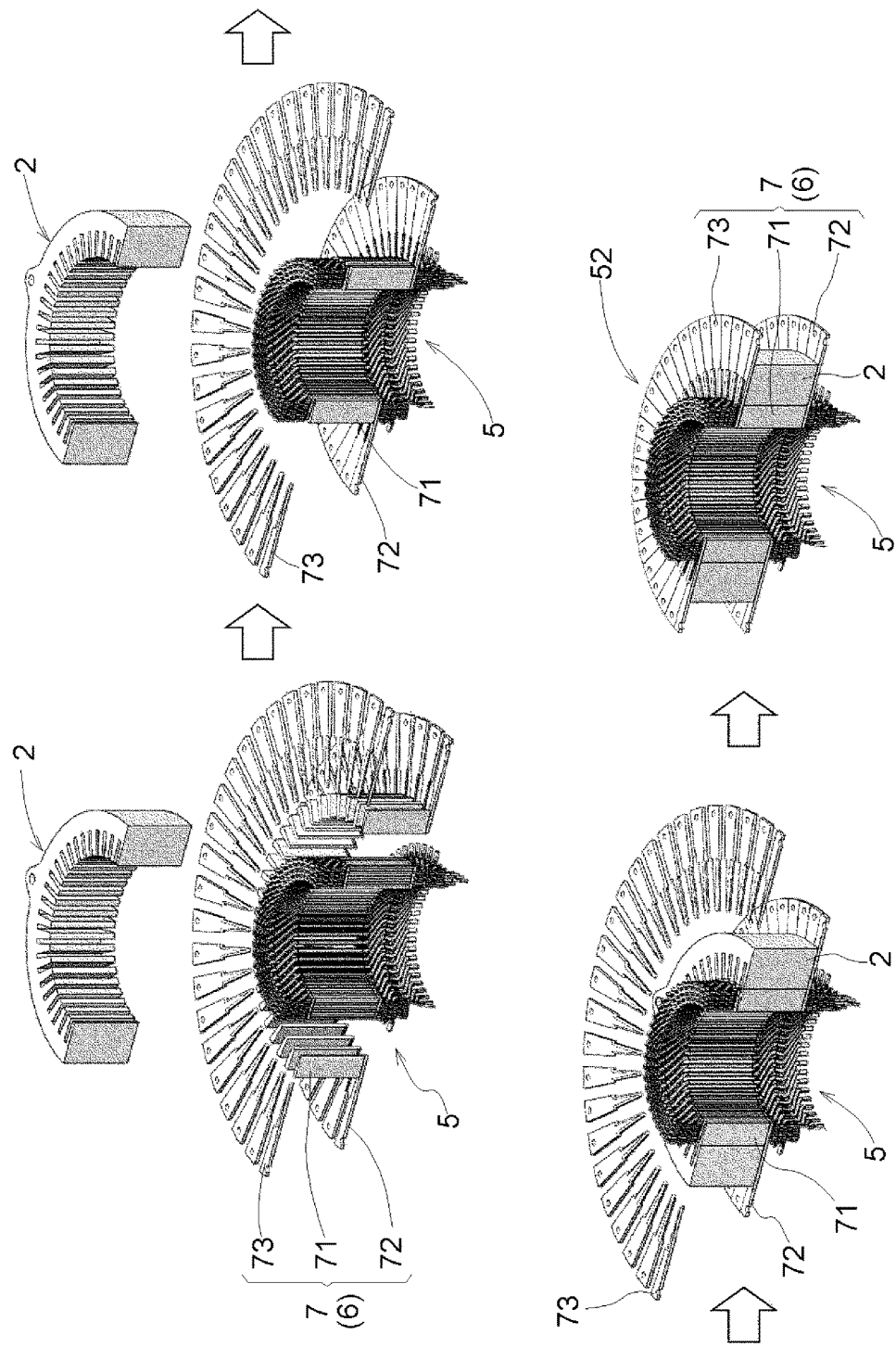
FIG. 9 is a diagram illustrating procedures for attaching guide jigs to the unit assembly.
Figure 10:
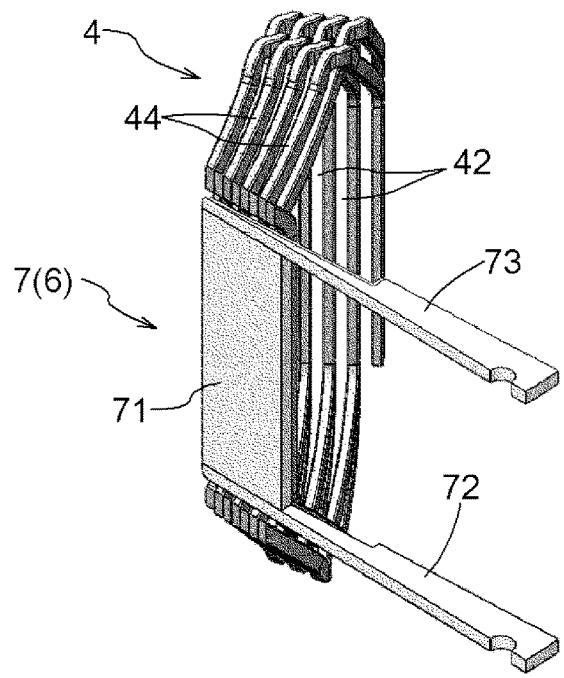
FIG. 10 is a perspective view showing the positional relationship between a coil unit and a guide jig before insertion.

In order to attach such guide jigs 7 to the unit assembly 5, as shown in FIG. 9, the first guide members 71 and the second guide members 72 are first inserted into the inter-side clearances 58 of the unit assembly 5 radially inward from the outside in the radial direction and attached thereto. Next, the core 2 having a hollow cylindrical shape is inserted in the axial direction L onto the unit assembly 5 having only the first guide members 71 and the second guide members 72 attached thereto (the third guide members 73 have not been attached to the unit assembly 5) from the opposite side in the axial direction L from the second guide members 72. As described above, since the core 2 and the coil 3 (coil units 4) are a combination that satisfies the relational expression (2), the core 2 is appropriately and reliably inserted onto the unit assembly 5 without interference between the unit assembly 5 and the core 2. Finally, the third guide members 73 are inserted into the inter-side clearances 58 of the unit assembly 5 radially inward from the outside in the radial direction and attached thereto.

Subsequently, the phases of the core 2 and the unit assembly 5 are adjusted to position the core 2 and the unit assembly 5 in the circumferential direction C. By this phase adjustment and positioning, the first guide members 71 are placed radially inside the teeth 22 so as to adjoin and face the teeth 22, and the coil side portions 42 of the coil units 4 are placed radially inside the slots 23 so as to adjoin and face the slots 23. An assembly 52 of the unit assembly 5 having the guide jigs 7 attached thereto and the core 2 is thus produced by the guide jig attachment step.

The insertion step is a step of inserting the coil side portions 42 of the plurality of coil units 4 of the unit assembly 5 into the slots 23. In the insertion step, with the unit assembly 5 with the guide jigs 7 attached thereto being placed radially inside the core 2, the plurality of coil units 4 are pressed radially outward in a radial fashion to insert the coil side portions 42 of each coil unit 4 into associated slots 23. In the present embodiment, such an insertion step is performed by using the pressing device 8 included in the stator manufacturing device 6.

Figure 11:
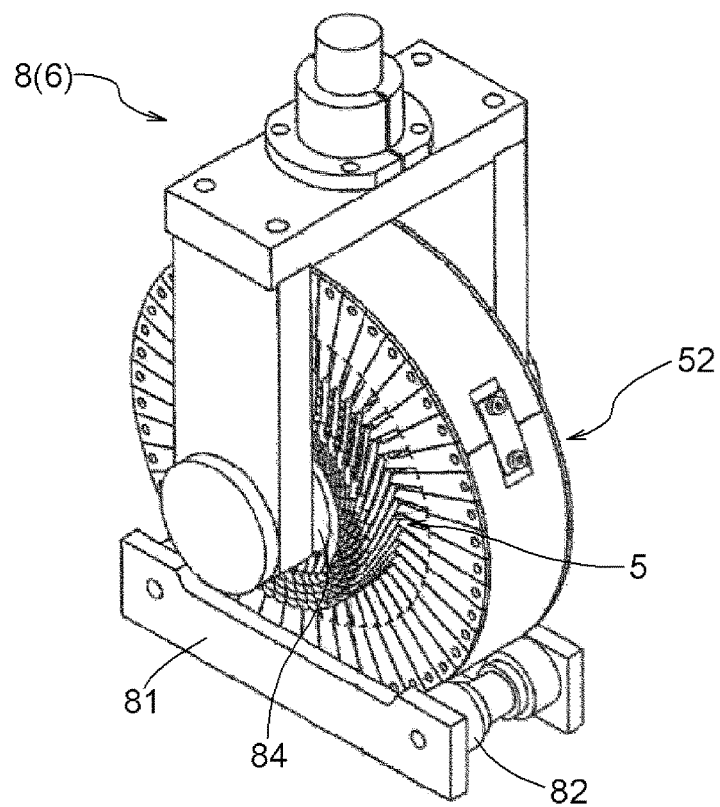
FIG. 11 is a perspective view of a stator manufacturing device.
Figure 12:
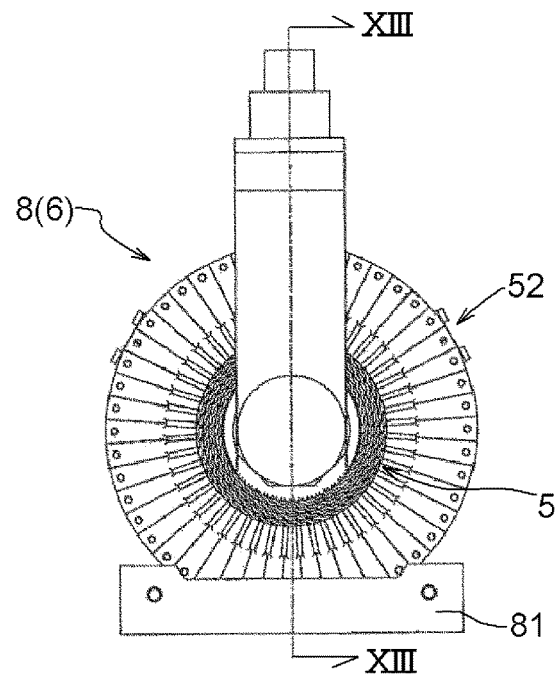
FIG. 12 is a front view of the stator manufacturing device.
Figure 13:
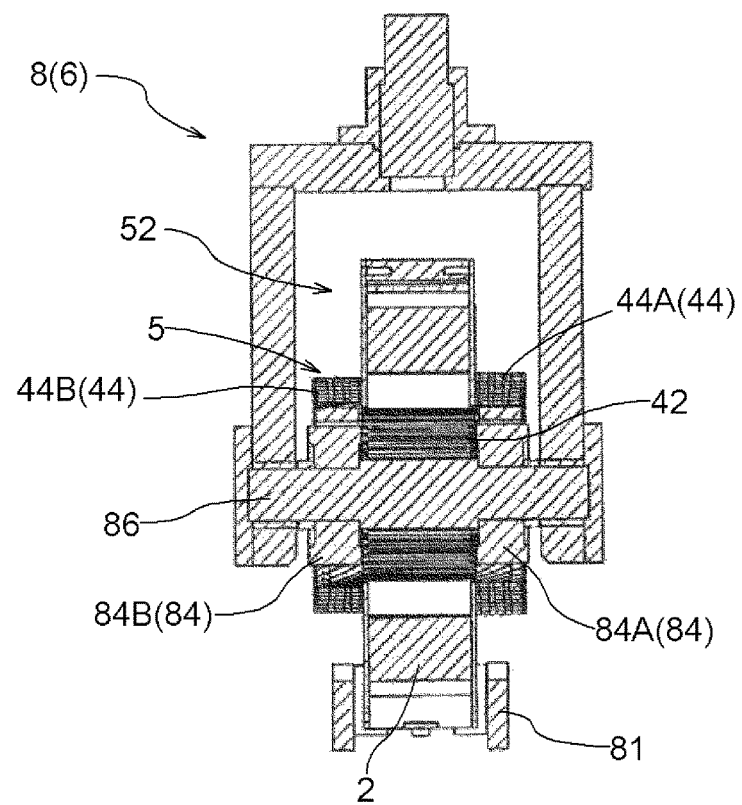
FIG. 13 is a sectional view taken along line XIII-XIII in FIG. 12.

The pressing device 8 is a device that generates a pressing force required to fit the coil units 4 in the core 2 (specifically, to insert the coil side portions 42 into the slots 23) when manufacturing the stator 1. FIGS. 11 to 13 show an example of such a pressing device 8. In this example, the pressing device 8 mainly includes a support base 81 and a pressing roller 84. The support base 81 is a base that holds the assembly 52 of the unit assembly 5 having the guide jigs 7 attached thereto and the core 2. The support base 81 has a pair of support rollers 82 that contact the outer peripheral surface of the assembly 52. The support base 81 rotatably supports the assembly 52 with the pair of support rollers 82.

The pressing roller 84 presses the coil units 4 (specifically, the bridging portions 44) included in the unit assembly 5 of the assembly 52 supported by the support base 81 radially outward in a radial fashion from the inside in the radial direction. The pressing roller 84 is placed in a space located radially inside the unit assembly 5 and located outside the core 2 in the axial direction L. The pressing roller 84 is a member having a columnar shape and is placed so that its axis extends parallel to the axis X of the core 2. The pressing roller 84 includes a pair of a first roller 84A and a second roller 84B. The first roller 84A is placed on one side in the axial direction L of the core 2 so that the first roller 84A can contact the first bridging portions 44A of the coil units 4. The second roller 84B is placed on the other side in the axial direction L of the core 2 so that the second roller 84B can contact the second bridging portions 44B of the coil units 4. The first roller 84A and the second roller 84B are coupled together by a coupling shaft 86 extending through the space radially inside the unit assembly 5 in the axial direction L.

The support base 81 and the pressing roller 84 can move relative to each other in the radial direction R.

For example, the pressing roller 84 can move relative to the support base 81 in the radial direction R (as an example, in the vertical direction in the case where the assembly 52 is supported so that its axis extends in the horizontal direction). The present disclosure is not limited to this configuration, and the support base 81 may be able to move toward the pressing roller 84. The relative movement between the support base 81 and the pressing roller 84 is made in such a range that the coil side portions 42 of the coil units 4 are appropriately accommodated in the slots 23 and that the coupling shaft 86 does not contact the radially inner end faces of the teeth 22.

Figure 14:
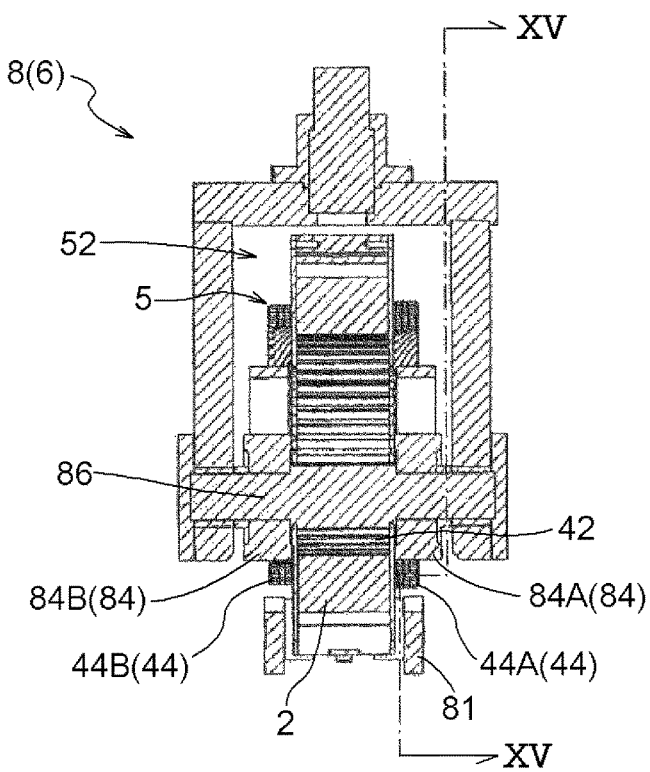
FIG. 14 is a diagram corresponding to FIG. 13, showing the state during insertion of coil units.
Figure 15:
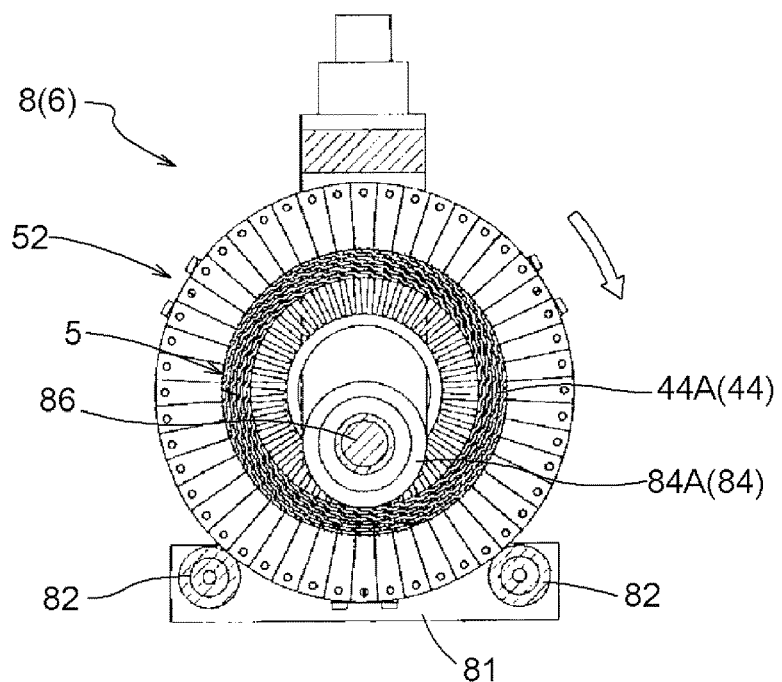
FIG. 15 is a sectional view taken along line XV-XV in FIG. 14.

In the insertion step, the coil side portions 42 of the plurality of coil units 4 forming the unit assembly 5 are inserted into the slots 23 by using such a pressing device 8. First, as shown in FIGS. 11 to 13, the assembly 52 of the unit assembly 5 having the guide jigs 7 attached thereto and the core 2 is placed on the support base 81. Next, as shown in FIGS. 14 and 15, the pressing roller 84 is gradually moved toward the support base 81 while rotating the assembly 52 supported by the support rollers 82 of the support base 81. The pressing roller 84 thus presses parts of the bridging portions 44 in the circumferential direction C radially outward and gradually moves the pressing position in the circumferential direction C. More specifically, the first roller 84A sequentially contacts the first bridging portions 44A of the coil units 4 included in the assembly 52 and moves relatively in the circumferential direction C to sequentially press the first bridging portions 44A radially outward. At the same time, the second roller 84B sequentially contacts the second bridging portions 44B of the coil units 4 included in the assembly 52 and moves relatively in the circumferential direction C to sequentially press the second bridging portions 44B radially outward along the circumferential direction C.

Figure 16:
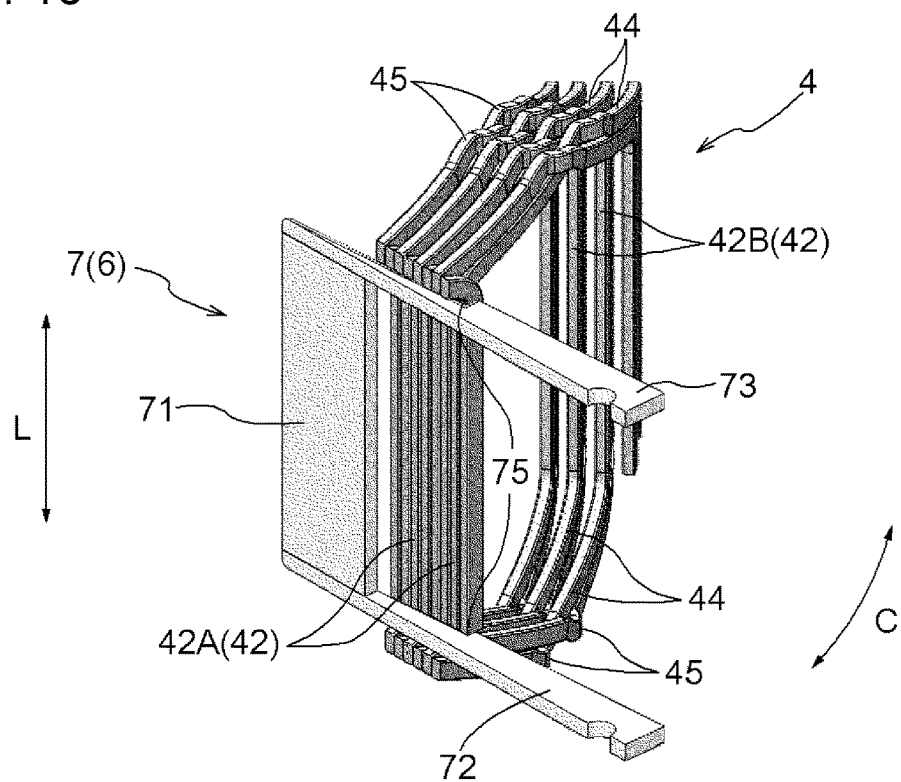
FIG. 16 is a perspective view showing the positional relationship between a coil unit and a guide jig after insertion.

When the bridging portions 44 of the coil units 4 are pressed radially outward, the coil side portions 42 leading to the bridging portions 44 are pulled radially outward accordingly. At this time, as shown in FIG. 16, each coil side portion 42 is guided by the first guide member 71, the second guide member 72, and the third guide member 73 and smoothly inserted into the slot 23. During this insertion, each coil unit 4 is deformed so that the circumferential interval between the first coil side portion 42A and the second coil side portion 42B increases (see FIGS. 10 and 16). At the same time, each coil unit 4 is deformed so that the axial interval between the axial tip ends (in this example, the offset portions 45) of the bridging portions 44 located on both sides in the axial direction L decreases. The unit assembly 5 is therefore increased in diameter and reduced in axial length (length of separation between the axial tip ends of the bridging portions 44 located on both sides) as compared to before insertion into the slots 23.

When the bridging portions 44 of all the coil units 4 of the unit assembly 5 are pressed radially outward, the coil side portions 42 of all the coil units 4 are inserted into the slots 23 accordingly. The coil side portions 42 are thus inserted into the slots 23 by the pressing device 8 that sequentially presses the bridging portions 44 radially outward along the bridging portions 44 extending in the circumferential direction C, so that each coil unit 4 is wound between a pair of slots 23. As described above, according to the stator manufacturing method of the present embodiment, the unit assembly 5 that is placed so that the coil side portions 42 of two coil units 4 are placed alternately in the radial direction R at the same circumferential position is attached to the cylindrical core 2, whereby the stator 1 can be produced.

Japanese Patent Application Publication No. 2011-193597 discloses an example of a stator manufacturing method using a cylindrical core and coil units forming a coil, in which a stator is manufactured by fitting the coil units in the core. In this manufacturing method, a jig having a plurality of holding grooves formed in the outer peripheral surface of its columnar body is used to fit the coil (the plurality of coil units) in the core. More specifically, the coil is fitted by the step of placing the coil units one by one in each holding groove of the jig and the step of placing the coil units held by the jig radially inside the core and pressing the coil units radially outward in a radial fashion to insert coil side portions of the coil units into slots of the core. In this method, regarding two coil units whose coil side portions are accommodated in the same slot, the coil side portions of one of the coil units are located in the outer side in the radial direction of the slot and the coil side portions of the other coil unit are located in the inner side in the radial direction of the slot. Since these coil side portions are thus located in the outer and inner sides in the radial direction of the slot, these coil side portions can also be inserted one by one, and the coil units do not interfere with each other when the coil is placed radially inside the core.

Figure 17:
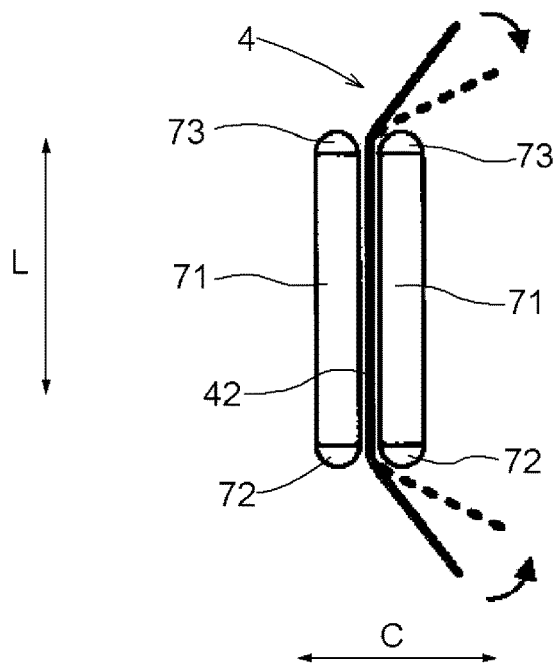
FIG. 17 is a diagram showing how a coil unit is deformed during insertion.

As shown in FIG. 17, in the insertion step, each coil side portion 42 of each coil unit 4 is sandwiched between two first guide members 71 located on both sides of the coil side portion 42 and adjoining each other in the circumferential direction C, and is guided by the two first guide members 71. Accordingly, when the coil unit 4 is deformed during insertion, each coil side portion 42 can be contacted and supported by the two first guide members 71 located on both sides thereof. This can restrain the coil side portions 42 from being deformed outward in the circumferential direction C.

As described above, in the insertion step of the present embodiment, the coil side portions 42 are inserted into the slots 23 by the pressing device 8 that sequentially presses the bridging portions 44 radially outward along the bridging portions 44 extending in the circumferential direction C. In this insertion operation, each coil unit 4 is inserted into the slot 23 after one of the pair of coil side portions 42 is located radially outside the other. For example, in FIG. 18, when a radially outward pressing force is applied from the pressing roller 84 to the unit assembly 5 while the assembly 52 (core 2) is rotating during insertion, each coil unit 4 is tilted with respect to the circumferential direction C so that the pressed first coil side portions 42A are located radially outside the second coil side portions 42B, namely the other coil side portions of the same coil unit 4. At this time, a load is unevenly applied to the pair of coil side portions 42 of each coil unit 4. An asymmetrical load that causes a twist in the slot 23 is applied to each coil side portion 42. If such a load is applied, the rectangular wire 32 and the insulating sheet 28 may be damaged depending on the circumstances.

As a solution to this problem, in the present embodiment, the rectangular wire 32 in the pair of coil side portions 42 of each coil unit 4 is formed to have an asymmetrical shape rather than a typical symmetrical shape regarding its four corners. That is, the rectangular wire 32 in each coil side portion 42 has an asymmetrical shape with a pair of inner peripheral corners 34 having a different radius of curvature from a pair of outer peripheral corners 36. Specifically, the pair of inner peripheral corners 34 of the rectangular wire 32 have a larger radius of curvature than the pair of outer peripheral corners 36 thereof. The inner peripheral corners 34 are a pair of corners located closer to the inner periphery (the center of turn) when the coil unit 4 is wound between the pair of slots 23, out of the four corners of the rectangular wire 32. The outer peripheral corners 36 are the remaining ones of the four corners of the rectangular wire 32, namely a pair of corners located closer to the outer periphery when the coil unit 4 is wound between the pair of slots 23. In the case where any corner of the rectangular wire 32 has a right-angled edge, the radius of curvature of this corner is regarded as "0 (zero)."

For example, it is preferable that the radius of curvature of the inner peripheral corners 34 be equal or larger than twice (preferably equal to or larger than three times) the radius of curvature of the outer peripheral corners 36. Such relatively greatly rounded inner peripheral corners 34 can restrain the twisting load that is applied to each coil side portion 42 in the insertion step. Specifically, if the coil side portions 42 twisted in the slot 23, the coil side portions 42 are tilted with respect to the sidewalls 23b of the slot 23. However, since the inner peripheral corners 34 are greatly rounded, the corners of the coil side portions 42 are restrained from hitting the sidewall 23b hard. The inner peripheral corners 34 have a larger radius of curvature because the surface of the coil side portion 42 which is located closer to the inner periphery (the center of turn) hits the sidewall 23b of the slot 23 hard when the coil unit 4 is inserted while increasing the circumferential interval between the pair of coil side portions 42.

Since the inner peripheral corners 34, namely the corners that hit the sidewall 23b hard, have a larger radius of curvature, stress that is applied where the coil side portion 42 hits the sidewall 23b can be reduced. This can effectively restrain damage to the rectangular wire 32 and the insulating sheet 28, whereby electrical insulation between the core 2 and the coil 3 can be satisfactorily ensured.

Figure 18:
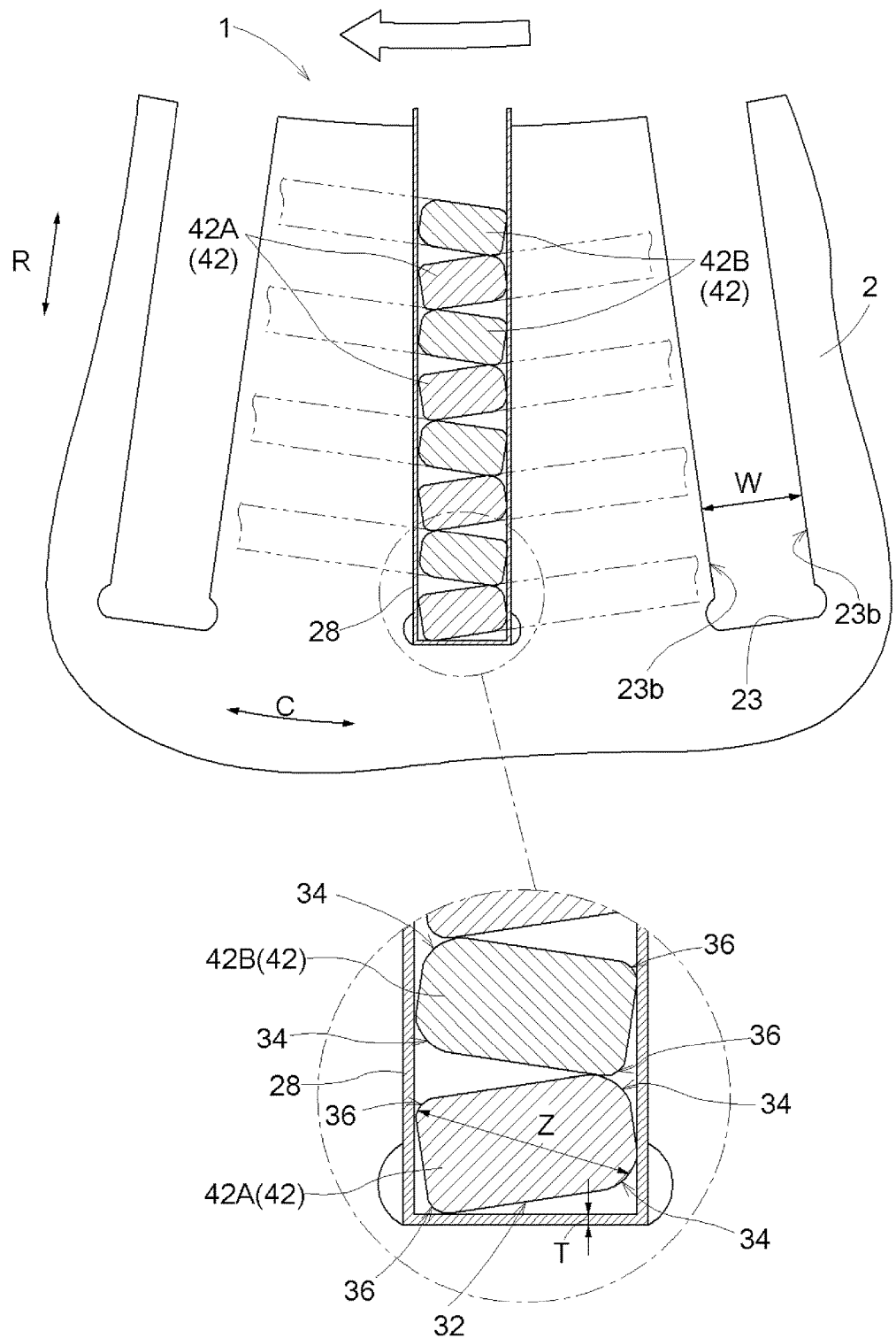
FIG. 18 is a partial sectional view of the stator.

In such a configuration, as shown in FIG. 18, the plurality of coil side portions 42 that are placed in the same slot 23 are arranged so that their relatively greatly rounded corners having a larger radius of curvature alternately face toward one side and the other side in the circumferential direction C along the radial direction R. The plurality of coil side portions 42 that are placed in the same slot 23 are also arranged in a zig-zag pattern along the radial direction R so that the coil side portions 42 are alternately tilted in the opposite directions with respect to the radial direction R.

The coil 3 (coil units 4) that satisfies the following relational expression (3) in relation to the specification of the core 2 is used in the present embodiment.

$$Z \leq W - 2 \cdot T \qquad (3)$$

In the relational expression (3), an algebra "Z" represents the diagonal width between the inner peripheral corner 34 and outer peripheral corner 36 which are diagonally located in the rectangular wire 32 having a rectangular section. An algebra "W" represents the circumferential width of the slot 23 (the circumferential width between the pair of side ails 23b forming a parallel slot). An algebra "T" represents the thickness of the insulating sheet 28.

In the case of using the coil 3 (coil units 4) that satisfies the relational expression (3) in relation to the specification of the core 2, both of the pair of diagonal corners of the rectangular wire 32 of the coil side portion 42 are not pressed against the sidewalls 23b on both sides of the slot 23 with the insulating sheet 28 interposed therebetween, even if each coil side portion 42 is actually twisted in the insertion step and the coil side portion 42 is tilted. Accordingly, the twisting load that is applied to each coil side portion 42 in the insertion step can be effectively restrained, and electrical insulation between the core 2 and the coil 3 can be satisfactorily ensured.

Other Embodiments

Other embodiments of the stator manufacturing method and the coil will be described. Configurations disclosed in each of the following, embodiments can be combined with those disclosed in other embodiments as appropriate unless inconsistency arises.

(1) The above embodiment is described with respect to an example in which the stator 1 is manufactured by using the core 2 having 48 slots 23. However, the present disclosure is not limited to such a configuration. For example, the number of slots "N" of the core 2 may be 24, 36, 60, . . . , etc. In this case, other specifications of the core 2 and the coil 3 (coil units 4) are determined according to the number of slots of the core 2 as well so as to satisfy the relational expression (1).

(2) The size of the core 2 shown in the figures of the above embodiment is by way of example only. The present disclosure is not limited to such a configuration, and the size (including the core inside diameter "Ri") of the core 2 may be determined as appropriate according to the performance etc. required for rotating electrical machines. In this case, other specifications of the core 2 and the coil 3 (coil units 4)

are determined according to the size of the core 2 as well so as to satisfy the relational expression (1).

(3) The size of the slots 23 shown in the figures of the above embodiment is by way of example only. The present disclosure is not limited to such a configuration, and the circumferential width "W" and the depth "D" of the slots 23 may be determined as appropriate according to the performance etc. required for rotating electrical machines. In this case, other specifications of the core 2 and the coil 3 (coil units 4) are determined according to the size of the slots 23 as well so as to satisfy at least one of the relational expressions (2) and (3).

(4) The above embodiment is described with respect to an example in which the stator 1 is manufactured by using the coil 3 that is formed by the rectangular wire 32 having a flat rectangular section with an aspect ratio of about 2:1. However, the present disclosure is not limited to such a configuration. The circumferential width "A" and the radial width "B" of the rectangular wire 32 may be determined as appropriate and the ratio therebetween may be determined as appropriate. In this case, other specifications of the core 2 and the coil 3 (coil units 4) are determined according to the size of the rectangular wire 32 as well so as to satisfy the relational expression (1).

(5) The above embodiment is described mainly with respect to the configuration in which a total of eight coil side portions 42 are placed in line in a single slot 23. However, the present disclosure is not limited to such a configuration. For example, the number of coil side portions 42 (the number of layers) that are placed in a single slot 23 may be 3, 4, 5, 6, 7, . . . , etc. The three or more coil side portions 42 are placed so that the first coil side portions 42A of the first coil unit 4 and the second coil side portions 42B of the second coil unit 4 are arranged alternately and in line. In this case, other specifications of the core 2 and the coil 3 (coil units 4) are determined according to the number of layers as well so as to satisfy the relational expression (1).

(6) The above embodiment is described with respect to an example in which the pair of inner peripheral corners 34 of the rectangular wire 32 have a larger radius of curvature than the pair of outer peripheral corners 36 thereof. However, the present disclosure is not limited to such a configuration. The inner peripheral corners 34 and the outer peripheral corners 36 may have the same radius of curvature, or the inner peripheral corners 34 may have a smaller radius of curvature than the outer peripheral corners 36.

(7) The above embodiment is described with respect to an example in which the number of slots per pole per phase is "2." However, the present disclosure is not limited to such a configuration. For example, the number of slots per pole per phase may be "1," "3" etc.

(8) The above embodiment is described with respect to an example in which the coil side portions 42 of the coil units 4 are sequentially inserted into the slots 23 by using the pressing device 8 having the pressing roller 84. However, the present disclosure is not limited to such a configuration. All the coil side portions 42 may be inserted into the slots 23 at a time. The coil side portions 42 may be inserted into the slots 23 by pulling the bridging portions 44 radially outward. Alternatively, the coil side portions 42 may be inserted into the slots 23 by pressing the bridging portions 44 in the axial direction L and thus deforming the coil units 4 so as to increase the interval between adjoining ones of the coil side portions 42.

(9) It should be understood that, regarding other configurations as well, the embodiment disclosed in the specification is by way of example only in all respects. Accordingly, those skilled in the art may make various modifications as appropriate without departing from the spirit and scope of the present disclosure.

Summary of Embodiment

Based on the above description, a stator manufacturing method according to the present disclosure preferably includes the following configurations.

1

A stator manufacturing method in which a coil (3) including a plurality of coil units (4) formed by winding a rectangular wire (32) is fitted in a cylindrical core (2) having a plurality of slots (23) extending in a radial direction (R) and opening in a core inner peripheral surface (25) so that the slots (23) are distributed in a circumferential direction (C), the rectangular wire (32) being a linear conductor having a rectangular section, wherein each of the coil units (4) includes, as coil side portions (42) that are placed in the slots (23), first coil side portions (42A) that are placed in one of a pair of the slots (23), and second coil side portions (42B) that are placed in the other of the pair of the slots (23), the stator manufacturing method including; a unit assembly formation step of forming a unit assembly (5) in which the plurality of coil units (4) are arranged in an annular shape by fitting the plurality of coil units (4) together; and an insertion step of, with the unit assembly (5) being located radially inside the core (2), inserting each of the coil side portions (42) of the plurality of coil units (4) forming the unit assembly (5) into an associated one of the slots (23), wherein a combination of a core (2) and a coil (3) which satisfies the following relational expression (1) is used as the core (2) and the coil (3)

$$2\pi \cdot (Ri - B \cdot L) > A \cdot N \tag{1}$$

[in the relational expression (1), A represents a circumferential width of the rectangular wire (32), B represents a radial width of the rectangular wire (32), L represents the number of coil side portions (42) that are placed next to each other in the radial direction (R) in each of the slots (23), N represents the number of slots (23), and Ri represents a radius of the core inner peripheral surface (25)].

According to this configuration, a unit assembly in which the first coil side portions of the first coil unit acid the second coil side portions of the second coil unit are arranged alternately and in line is formed by the unit assembly formation step. At this time, the use of the combination of the core and the coil which satisfies the relational expression (1) ensures that the unit assembly formed by the unit assembly formation step is reliably placed radially inside the core with at least each coil unit being located on the inner side in the radial direction. The subsequent insertion step can thus be performed appropriately. That is, a stator manufacturing method can be implemented in which the unit assembly having the coil side portions of two coil units being arranged alternately in the radial direction at the same circumferential direction can be placed radially inside the cylindrical core and fitted therein.

A coil according to the present disclosure preferably includes the following configurations.

2

A coil (3) that is fitted in a cylindrical core (2) having a plurality of slots (23) extending in a radial direction (R) and opening in a core inner peripheral surface (25) so that the slots (23) are distributed in a circumferential direction (C) including: a plurality of coil units (4) each formed by a rectangular wire (32) and each wound between a pair of the slots (23), the rectangular wire (32) being a linear conductor having a rectangular section, wherein each of the coil units (4) includes, as coil side portions (42) that are placed in the slots (23), first coil side portions (42A) that are placed in one of a pair of the slots (23), and second coil side portions (42B) that are placed in the other of the pair of the slots (23), a plurality of the coil side portions (42) are placed in line in the radial direction (R) in each of the slots (23), and the first coil side portions (42A) of a first one of the coil units (4) and the second coil side portions (42B) of a second one of the coil units (4) are alternately arranged, and the coil (3) satisfies the following relational expression (1)

$$2\pi \cdot (Ri-B \cdot L) > A \cdot N \tag{1}$$

[in the relational expression (1), A represents a circumferential width of the rectangular wire (32), B represents a radial width of the rectangular wire (32), L represents the number of coil side portions (42) that are placed next to each other in the radial direction (R) in each of the slots (23), N represents the number of slots (23), and Ri represents a radius of the core inner peripheral surface (25)].

According to this configuration, for example, when a unit assembly is formed by fitting the coil units together with the first coil side portions of the first coil unit and the second coil side portions of the second coil unit being arranged alternately and in line, this unit assembly has such a size that it can be placed radially inside the core with at least each coil unit being located on the inner side in the radial direction. Accordingly, the unit assembly is subsequently placed radially inside the core 2, and in this state, each coil unit is moved radially outward so that the coil side portions of each coil unit can be inserted into associated slots. That is, a coil can be implemented which is an assembly in which coil side portions of two coil units are arranged alternately in the radial direction at the same circumferential position, and which can be fitted into a cylindrical core from the inside in the radial direction.

3

The coil (3) satisfies the following relational expression (2)

$$B \cdot L < D \tag{2}$$

[In the relational expression (2), D represents a depth of the slots (23)].

According to this configuration, all of the coil side portions are placed appropriately in each slot of the final stator without protruding radially inward from the slots. The stator that is produced by using such a coil can be reliably formed in an appropriate shape.

The stator manufacturing method and the coil according to the present disclosure need only to have at least one of the effects described above.

INDUSTRIAL APPLICABILITY

For example, the technique according to the present disclosure is applicable to stator manufacturing methods in which a coil is fitted in a cylindrical core.

The invention claimed is:
1. A stator manufacturing method in which a coil including a plurality of coil units formed by winding a rectangular wire is fitted in a cylindrical core having a plurality of slots extending in a radial direction and opening in a core inner peripheral surface so that the slots are distributed in a circumferential direction, the rectangular wire being a linear conductor having a rectangular section, wherein
each of the coil units includes, as coil side portions that are placed in the slots, first coil side portions that are placed in one of a pair of the slots, and second coil side portions that are placed in the other of the pair of the slots, the stator manufacturing method comprising:
forming a unit assembly in which the plurality of coil units are arranged in an annular shape by fitting the plurality of coil units together so that the first coil side portions of a first one of the coil units and the second coil side portions of a second one of the coil units are placed in line in the radial direction and arranged alternately; and
inserting, with the unit assembly being located radially inside the core, each of the coil side portions of the plurality of coil units forming the unit assembly into an associated one of the slots, wherein
a combination of the core and the coil which satisfies the following relational expression (1) is used as the core and the coil

$$2\pi \cdot (Ri-B \cdot L) > A \cdot N \tag{1}$$

where:
A represents a circumferential width of the rectangular wire,
B represents a radial width of the rectangular wire,
L represents the number of coil side portions that are placed next to each other in the radial direction in each of the slots,
N represents the number of slots, and
Ri represents a radius of the core inner peripheral surface.

2. A coil that is fitted in a cylindrical core having a plurality of slots extending in a radial direction and opening in a core inner peripheral surface so that the slots are distributed in a circumferential direction, comprising:
a plurality of coil units each formed by a rectangular wire and each wound between a pair of the slots, the rectangular wire being a linear conductor having a rectangular section, wherein
each of the coil units includes, as coil side portions that are placed in the slots, first coil side portions that are placed in one of a pair of the slots, and second coil side portions that are placed in the other of the pair of the slots,
a plurality of the coil side portions are placed in line in the radial direction in each of the slots, and the first coil side portions of a first one of the coil units and the second coil side portions of a second one of the coil units are alternately arranged, and
the coil satisfies the following relational expression (1)

$$2\pi \cdot (Ri-B \cdot L) > A \cdot N \tag{1}$$

where:
A represents a circumferential width of the rectangular wire,
B represents a radial width of the rectangular wire,
L represents the number of coil side portions that are placed next to each other in the radial direction in each of the slots,
N represents the number of slots, and
Ri represents a radius of the core inner peripheral surface.

3. The coil according to claim 2, wherein the coil satisfies the following relational expression (2)

$$B \cdot L < D \tag{2}$$

where
D represents a depth of the slots.

* * * * *